US008768086B2

(12) United States Patent
Lee et al.

(10) Patent No.: US 8,768,086 B2
(45) Date of Patent: Jul. 1, 2014

(54) APPARATUS AND METHOD FOR DEPTH-IMAGE ENCODING WITH RATE-DISTORTION OPTIMIZATION

(75) Inventors: Jin Young Lee, Ansan-si (KR); Du Sik Park, Suwon-si (KR); Ho Cheon Wey, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 389 days.

(21) Appl. No.: 13/067,756

(22) Filed: Jun. 23, 2011

(65) Prior Publication Data

US 2012/0020549 A1    Jan. 26, 2012

(30) Foreign Application Priority Data

Jul. 20, 2010   (KR) ........................ 10-2010-0069793

(51) Int. Cl.
| | |
|---|---|
| *G06K 9/00* | (2006.01) |
| *H04N 13/00* | (2006.01) |
| *H04N 7/50* | (2006.01) |
| *H04N 7/26* | (2006.01) |
| *H04N 7/32* | (2006.01) |

(52) U.S. Cl.
CPC .... *H04N 19/00175* (2013.01); *H04N 2213/003* (2013.01); *H04N 13/0022* (2013.01); *H04N 19/00781* (2013.01); *H04N 19/00351* (2013.01); *H04N 19/0009* (2013.01); *H04N 19/00769* (2013.01)
USPC ........................................................ 382/251

(58) Field of Classification Search
USPC ........................... 382/154, 166, 199, 239, 251
See application file for complete search history.

(56) References Cited

U.S. PATENT DOCUMENTS

| | | | |
|---|---|---|---|
| 7,558,432 B2 | 7/2009 | Zaharia et al. | |
| 2009/0103616 A1* | 4/2009 | Ho et al. | 375/240.12 |
| 2010/0208994 A1* | 8/2010 | Yao et al. | 382/173 |
| 2011/0249190 A1* | 10/2011 | Nguyen et al. | 348/708 |
| 2011/0267348 A1* | 11/2011 | Lin et al. | 345/426 |

FOREIGN PATENT DOCUMENTS

| | | |
|---|---|---|
| JP | 2008-209275 | 9/2008 |
| JP | 2009-238117 | 10/2009 |
| KR | 10-2007-0061094 | 6/2007 |
| KR | 10-2008-0053873 | 6/2008 |
| KR | 10-2009-0014532 | 2/2009 |

OTHER PUBLICATIONS

Merkle P. et al., "The effects of multiview depth video compression on multiview rendering", Signal Processing. Image Communication, Elsevier Science Publishers, Amsterdam, NL, vol. 24, No. 1-2 (2009).

Woo-Shik Kim et al., "Depth map coding with distortion estimation of rendered view", Proceedings of SPIE-IS and T Electronic Imaging—Visual Information Processing and Communication 2010, vol. 7543.

(Continued)

*Primary Examiner* — Phuoc Tran

(74) *Attorney, Agent, or Firm* — Staas & Halsey LLP

(57) ABSTRACT

Provided is a rate-distortion optimizing apparatus and method for encoding a depth image. The rate-distortion optimizing apparatus may reduce a resolution in an area that does not include an edge that significantly affects image synthesis, and may use a high quantization parameter and thus, may provide a high compression performance.

24 Claims, 4 Drawing Sheets

(56) References Cited

OTHER PUBLICATIONS

Jungdong Seo et al., "Motion information sharing mode for depth video coding", 3DTV-Conference: The True Vision Capture, Transmission and Display of 3D Video (3DTV-CON), 2010, IEEE, Piscataway, NJ, USA.

Ramakrishna Kakarala et al., "A method for signalling block-adaptive quantization in baseline sequential JPEG", Tencon 2009—2009 IEEE Region 10 Conference, IEEE, Piscataway, NJ, USA.

European Search Report dated Oct. 24, 2011, corresponds to European Patent Application No. 11171627.0-1247.

* cited by examiner

US 8,768,086 B2

APPARATUS AND METHOD FOR DEPTH-IMAGE ENCODING WITH RATE-DISTORTION OPTIMIZATION

CROSS-REFERENCE TO RELATED APPLICATIONS

This application claims the priority benefit of Korean Patent Application No. 10-2010-0069793, filed on Jul. 20, 2010, in the Korean Intellectual Property Office, the disclosure of which is incorporated herein by reference.

BACKGROUND

1. Field

One or more embodiments relate to a rate-distortion optimizing method that is used to encode a depth image to generate a stereoscopic image.

2. Description of the Related Art

Recently, demand for three-dimensional (3D) images that allow users to view TV, movies, and the like, in 3D space has been rapidly increasing.

A stereoscopic image is a three-dimensional (3D) image that simultaneously provides information associated with depth and space. Stereoscopic schemes may provide stereoscopic effects with two or more images, for example, using a stereo image that merely provides a first image to one eye and a second image to a second eye, or using several images at different points of view to the left eye and right eye. With the latter approach, the several images may provide the stereoscope effect by being projected in different directions according to the point of view of an original camera or a point of view of the viewer relative to the centerline point of view. Here, the viewer observes different images as the viewer moves across the viewing area of the display. In such an arrangement with multiple images, a multi-view image may be used, where there are plural displayed images for potentially each pixel. The viewer would only observe the appropriate left and right images based on the current position of the viewer because of the display surface directs different stereo images in predetermined different directions. This approach of the stereoscopic schemes is called an autostereoscopic approach, with examples including the use of a parallax-barrier or lenticular lenses, to control the direction images can be observed from. With this arrangement, the multi-view image requires substantially more data to be available to generate the different points of view than needed in the stereo image approach.

Accordingly, corresponding multi-view images photographed at various points of view, such as by plural cameras arranged at different viewpoints, may be used to provide an image providing different looks as a viewer moves and changes its point of view. However, with the above noted two image stereoscopic approach, the point of view (or viewpoint) would be fixed, while with the autostereoscopic approach several points of view may be observed. With autostereoscopic approach systems, there is a limit in the number of points of view that may be observed by the viewer, which corresponds to potential mechanical limitations of the displays, bandwidth for the additional images, and processing capability for rendering all of the images, and potentially interpolating between different images representing neighboring points of view. Additionally, applications using the images photographed at various points of view may further include a free-viewpoint TV, a 3D TV, and the like. The 3D TV may change images projected to a viewer to enable the viewer to recognize a realistic 3D depth, such as in the above stereo image and the multi-view image projected according to the autostereoscopic approach.

The free-viewpoint TV (FTV) may obtain and analyze a multi-view image with respect to the same scene, and may change the observed point of view for an object. With the above noted autostereoscopic approach, the number of points of view (or viewpoints) and corresponding images that would be transmitted would at least be limited by the capability of the display to differently project each different image. Rather, with the free-viewpoint TV, the number of views that may be selected from for display could be unlimited as some implementations may permit the viewer to control the point of view, thereby permitting the selection of points of view, which could include selecting a point of view behind, above, below, or any other available point of view for an observed object. The number of points of view that may need to be available to such a system could be substantially greater than the autostereoscopic approach system, with the limitations in the number of points of view for the free-viewpoint TV being primarily caused by the underlying infrastructure. However, there are typically substantial difficulties in securing the necessary network infrastructure, terrestrial bandwidth, and the like to compress, transmit, and receive such a massive amount of data for the increased number of images photographed at the various points of view, which affects both 3D TVs that utilize an autostereoscopic approach and such free-viewpoint TVs.

SUMMARY

Foregoing issues have been overcome and/or other aspects are achieved by providing a method of optimizing compression of a 3D image including at least a color image and a depth image, the method including generating at least one candidate quantization parameter based on whether an edge is detected in an area of the color image corresponding to an area of the depth image, calculating a rate-distortion cost with respect to each of the at least one candidate quantization parameter based on a determined degree of distortion of each of the at least one candidate quantization parameter and based on a determined number of generated bits for each of the at least one candidate quantization parameter, selecting a compression mode that minimizes the calculated rate-distortion cost with respect to each of the at least one candidate quantization parameter, and selecting an optimal quantization parameter from among the at least one candidate quantization parameter for an encoding of the depth image.

Foregoing issues have been overcome and/or other aspects are achieved by providing an apparatus for optimizing compression of a 3D image including at least a color image and a depth image, the apparatus including a candidate parameter generator to generate at least one candidate quantization parameter based on whether an edge is detected in an area of the color image corresponding to an area of the depth image, a compression mode selector to calculate a rate-distortion cost with respect to each of the at least one candidate quantization parameter based on a determined degree of distortion of each of the at least one candidate quantization parameter and based on a determined number of generated bits of each of the at least one candidate quantization parameter, and to select a compression mode that minimizes the calculated rate-distortion cost with respect to each of the at least one candidate quantization parameter, and a quantization parameter selector to select an optimal quantization parameter from among the at least one candidate quantization parameter for an encoding of the depth image.

Foregoing issues have been overcome and/or other aspects are achieved by providing a method of optimizing compression of a 3D image including at least a color image and a depth image, the method including determining whether a spatial characteristic is detected in an area of the color image corresponding to an area of the depth image, wherein the spatial characteristic would exist in the area of the depth image when the spatial characteristic exists in the area of the color image, encoding the color image and the depth image, wherein the encoding of the depth image includes selectively encoding the depth image using a first quantization step size for at least the area of the depth image upon the determining indicating that the spatial characteristic is not detected in the area of the color image and encoding the depth image using a second quantization step size for at least the area of the depth image upon the determining indicating that the spatial characteristic is detected, wherein the first quantization step size is larger than the second quantization step size, and outputting the encoded color image an the encoded depth image.

Foregoing issues have been overcome and/or other aspects are achieved by providing an apparatus for optimizing compression of a 3D image including at least a color image and a depth image, the apparatus including a detector to determine whether a spatial characteristic is detected in an area of the color image corresponding to an area of the depth image, wherein the spatial characteristic would exist in the area of the depth image when the spatial characteristic exists in the area of the color image, a color image encoder to encode the color image, a depth image encoder to encode the depth image, wherein the encoding of the depth image includes selectively encoding the depth image using a first quantization step size for at least the area of the depth image upon the detector indicating that the spatial characteristic is not detected in the area of the color image and encoding the depth image using a second quantization step size for at least the area of the depth image upon the determining indicating that the spatial characteristic is detected, wherein the first quantization step size is larger than the second quantization step size, and a view synthesis unit to output a stereoscopic image based on the encoded color image an the encoded depth image.

Additional aspects and/or advantages of one or more embodiments will be set forth in part in the description which follows and, in part, will be apparent from the description, or may be learned by practice of one or more embodiments of disclosure. One or more embodiments are inclusive of such additional aspects.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
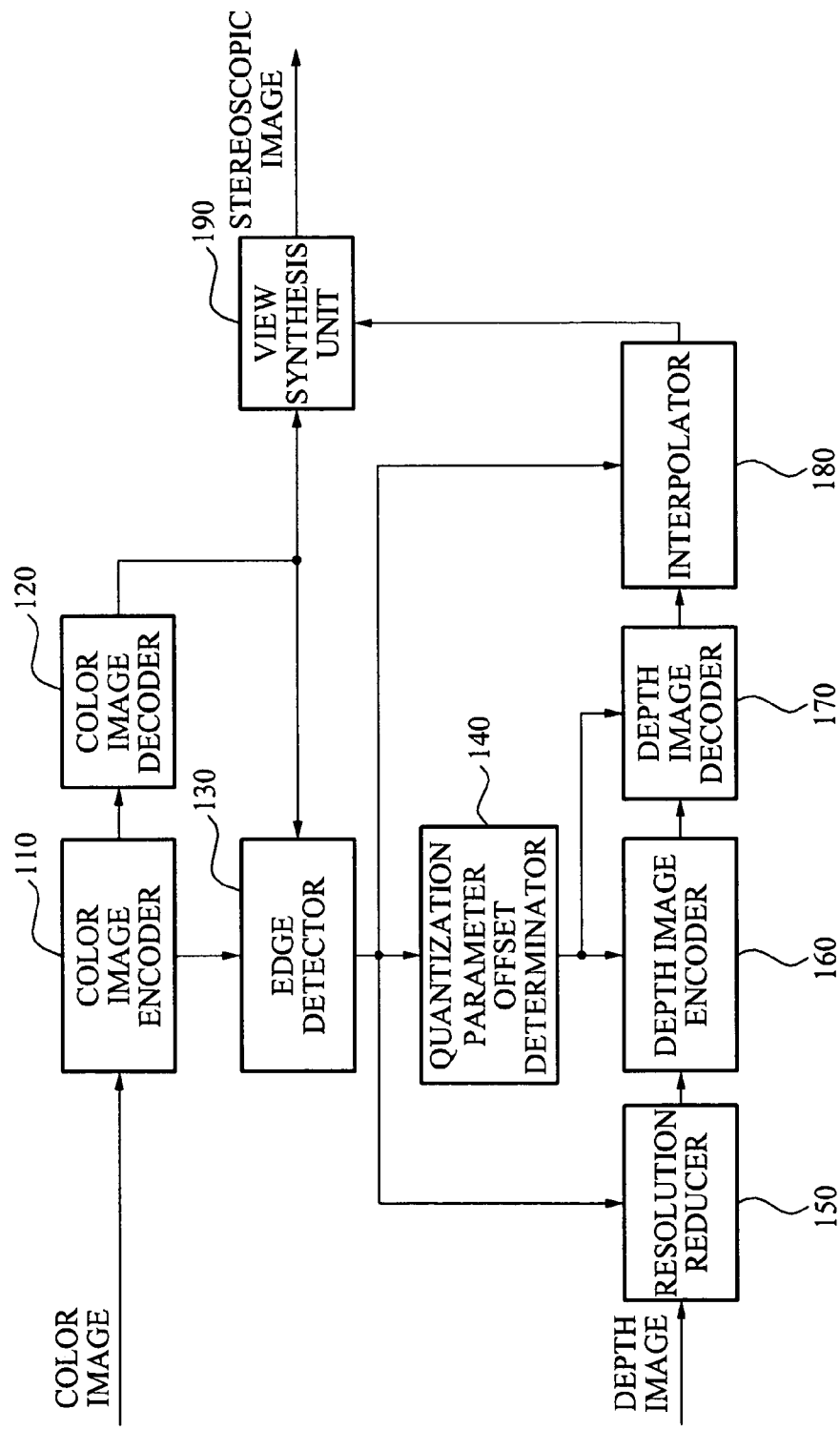
FIG. 1 illustrates a stereoscopic image compressing apparatus, according to one or more embodiments.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 illustrates a stereoscopic image compressing apparatus, according to one or more embodiments.

Referring to FIG. 1, a stereoscopic image compressing apparatus 100 may include a color image encoder 110, a color image decoder 120, an edge detector 130, a quantization parameter offset determiner 140, a resolution reducer 150, a depth image encoder 160, a depth image decoder 170, a interpolator 180, and a view synthesis unit 190, for example.

In depth images, as only an example, the distance between an object and a viewer in the color image may be represented by a value between zero and 255, similar to the scaling of intensity in color images. Thus, based on this observation, features of the depth image may be similar to the color image. Accordingly, in one or more embodiments, the depth image may be encoded based on a rate-distortion optimization scheme, like the color image.

However, rate-distortion optimization schemes are designed and optimized to encode color images, rather than being optimized for features and aspects of depth images. With color images, the rate-distortion optimization scheme includes selecting an optimal compression mode from among various compression modes used to compress a single image block, which may obtain a significantly high compression performance. However, this high compression performance optimized for color images may not provide the same increase in compression performance for depth images.

Additionally, the rate-distortion optimization schemes may typically select a compression mode that generates a minimal amount of data while also minimizing deterioration of an image for when the image is compressed and restored. Thus, the rate-distortion optimization for an image may be performed factoring in the deterioration of the restored image and the amount of data generated. Differently, the deterioration of a color image that may be synthesized based on a restored depth image, e.g., in a synthesizing of an image at a mid-point of view, is more important to the depth image compression than the deterioration of the depth image that is incurred when the image is compressed and restored.

Additionally, as opposed to respectively compressing and transmitting a video at the various points of view, and potentially distinct from the encoding and transmission of the depth image, when a depth image is generated and compressed together with several images of the images photographed at various points of view, it is found that there may typically be a lesser amount of data generated from the collective data compression compared to the separate data compresses for each point of view.

Accordingly, one or more embodiments may take the above findings into consideration and provide a rate-distortion optimizing technique for encoding a depth image with the encoding of a corresponding color image. Further, in one or more embodiments, information within a currently encoded color image may be used for controlling the current encoding of the depth image, by decoding the encoded color image and controlling the quantization step size and/or resolution in the encoding of the depth image based upon spatial characteristics, for example, within a corresponding area of the decoded color image.

In view of the above, the color image encoder 110 may encode a color image.

The color image decoder 120 may decode the encoded color image. A bit stream of the encoded color image may be decoded through the color image decoder 120. In an embodiment, the bit stream of the encoded color image may be encoded and transmitted.

The edge detector 130 may detect information associated with an edge in the decoded color image, based on various edge detecting algorithms. The edge detector 130 may multiply pixels in a restored image with pixels corresponding to the same location of a mask, and may allocate, to a center pixel (G), a sum of the multiplied pixels to detect edge information, based on an edge detecting algorithm, such as a sobel mask and the like, noting that alternative edge detection algorithms are available. The edge detector 130 may detect whether an edge is included in a pixel based on a value allocated to the center pixel. For example, the edge detector 130 may determine that the pixels include edges when the value allocated to the center pixel is greater than a predetermined value. For another example, the edge detector 130 may determine that the pixels do not include edges when the value allocated to the center pixel is less than the predetermined value.

The quantization parameter offset determinator 140 may set the quantization step size for a depth image block based on whether corresponding area(s) of the color image are determined to include an edge. When a corresponding area of the color image is determined to not include an edge, the quantization parameter offset determinator 140 may set the quantization step size for the corresponding depth image block to be greater than a preset quantization step size.

Likewise, in an embodiment, when a corresponding area of the color image is determined to not include an edge, the quantization parameter offset determinator 140 may not change the existing preset quantization step size for the corresponding depth or may merely set the quantization step size for the corresponding depth image block to be the preset quantization step size, e.g., if the quantization step size for the corresponding depth image block has not been set.

In one or more embodiments, when the corresponding area of the color image is determined to not include the edge, the resolution reducer 150 may reduce the resolution of the corresponding depth image block. Rather, when the corresponding area of the color image is determined to include an edge, the resolution reducer 150 may perform no resolution reduction operations for the corresponding depth image block, i.e., the resolution reducer 150 may not reduce the resolution of the corresponding depth image block, and the resolution of the corresponding depth image may be maintained at a current resolution.

Accordingly, in one or more embodiments, when an edge is detected in a corresponding area of the color image, the depth image encoder 160 may encode the depth image and/or corresponding depth image block with the reduced resolution determined by the resolution reducer 150, using the increased quantization step size set by the quantization parameter offset determinator 140. Rather, in one or more embodiments, when the edge is not detected in the corresponding area of the color image, the depth image encoder 160 may encode the depth image and/or corresponding depth image block with the current resolution and the preset quantization step size. Again, in one or more embodiments, the depth image encoder 160 may encode the depth image with a reduced resolution with respect to the depth image block corresponding to the area that does not include the edge in the color image, based on a quantization step size that is determined to be greater than the original quantization step size, and thus may increase the compression of the depth image.

The depth image decoder 170 may decode the depth image encoded by the depth image encoder 160. The depth image decoder 170 may restore the compressed depth image based on a quantization parameter offset determined by the quantization parameter offset determinator 140.

The interpolator 180 may improve a resolution of a decoded depth image block corresponding to the area that does not include the edge in the color image. The interpolation unit 180 may perform interpolation to increase, by an original size, the decoded depth image block based on a quantization step size that is greater than an original step size used when the depth image corresponding to the area that does not include the edge in the decoded color image.

The view synthesis unit 190 may synthesize a view-image based on a restored color image and the restored depth image. The view synthesis unit 190 may synthesize the view-image based on the restored color image output from the color image decoder 120 and the restored depth image output from the interpolator 180.

The stereoscopic image compressing apparatus 100 may generate a depth image, may compress the depth image based on, and together for example, with some of multiple images at various points of view, and may transmit the compressed image, as opposed to compressing and transmitting multiple video at various points of view, and thus, an amount of data generated during the stereoscopic image compression may be reduced.

As noted above, in the depth image, a distance between an object and a viewer in the color image may be represented by a value between zero and 255 and thus, features or aspects of the depth image may potentially be similar to the color image. Accordingly, the stereoscopic image compressing apparatus 100 may utilize information associated with the color image and information associated with the depth image, and thus, have enhanced performance over conventional compression techniques, such as when the depth image and color images are compressed and transmitted separately.

The stereoscopic image compressing apparatus 100 may effectively compress the stereoscopic image based on information associated with a detected edge in the color image, e.g., using the restored color image provided by the color image decoder 120 while the depth image is being compressed.

An apparatus of optimizing a rate-distortion based on information associated with the edge of the color image, as restored while the depth image is being compressed in a 3D video compression encoding system, will be further described with reference to FIG. 2.

Figure 2:
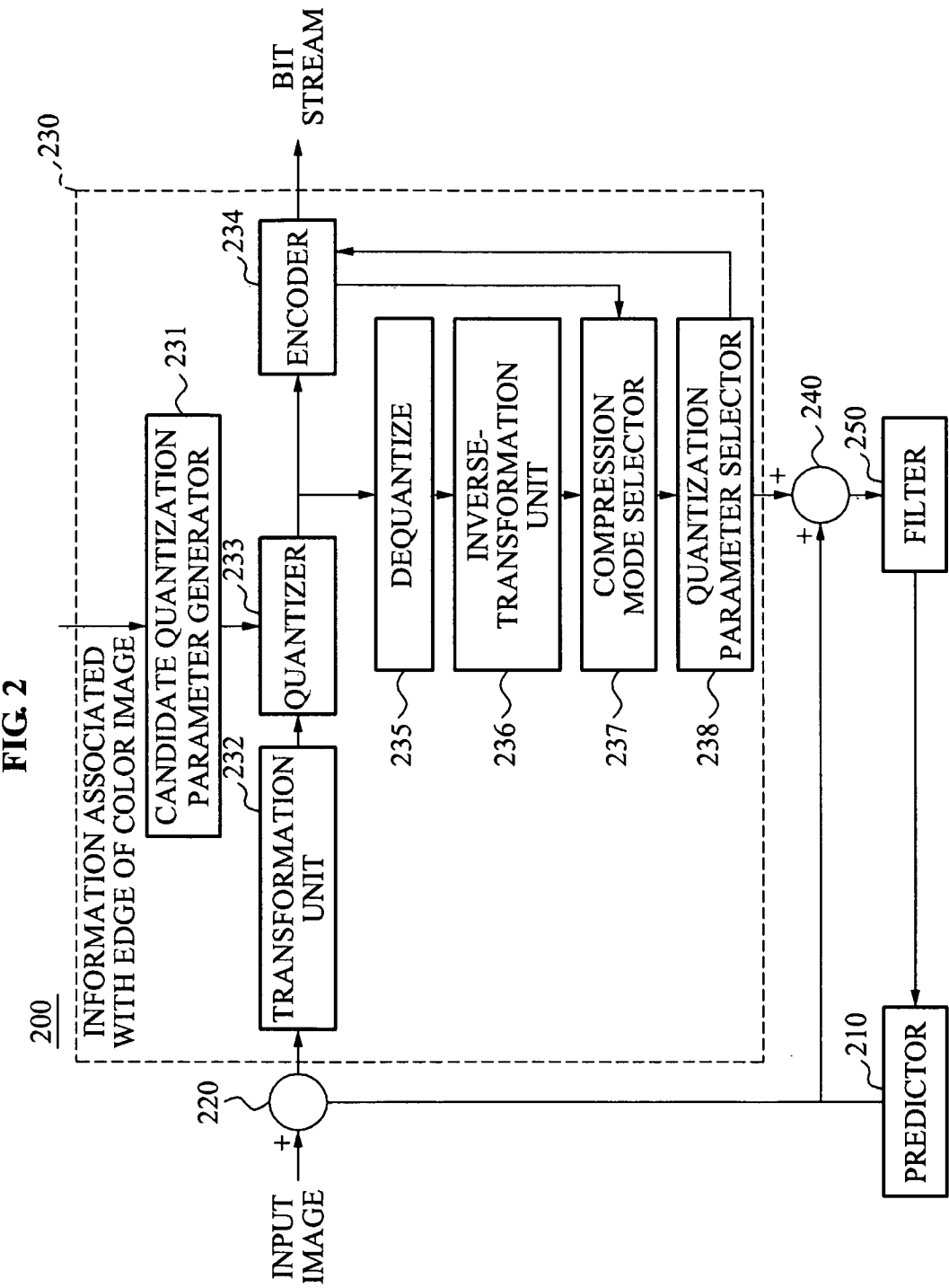
FIG. 2 illustrates a depth image encoding apparatus performing rate-distortion optimization, according to one or more embodiments.

FIG. 2 illustrates a depth image encoding apparatus 200 performing rate-distortion optimization according to one or more embodiments. Here, the depth image encoding apparatus 200 may be included in the stereoscopic image compressing apparatus 100, of FIG. 1, for example, but is not limited to the same. As only an example, the depth image encoding apparatus may perform one or more operations related to the depth image encoder 160 of FIG. 1.

Referring to FIG. 2, the depth image encoding apparatus 200 may include a predictor 210, a subtracter 220, a rate-distortion optimizing apparatus 230, an adder 240, and a filter 250, for example. As noted above, due to the similarities between the structure of the color image and the depth image, in one or more embodiments motion prediction may also be performed, as only an example of such available prediction schemes.

The predictor 210 may determine the current motion vector for a current block, and may generate a predicted block using the current motion vector. As only an example, the predictor 210 may predict a pixel value for each pixel of the current block that is to be encoded in the image, and may generate the predicted block having a predicted pixel value of each pixel. The predictor 210 may determine the current motion vector based on various schemes, such as a rate-distortion optimization (RDO) scheme and the like, and the determined current motion vector may be an optimal motion vector, noting that alternatives are available.

The subtracter 220 may generate a differential signal by subtracting the current block and the predicted block. The subtracter 220 may calculate a difference between the pixel value of each pixel of the current block to be encoded and the predicted pixel value of each pixel of the predicted block predicted by the predictor 210, and may generate a differential signal in a form of a block.

The adder 240 may restore the current depth block by adding the predicted block, predicted by the predictor 210, and a differential signal restored by the rate-distortion optimizing apparatus 230.

The filter 250 may store, based on a frame unit, the restored current depth block output from the adder 280 as a reference frame, and the predictor 210 may use the reference frame when encoding a next depth block of the current block or encoding another depth block, for future cases.

The rate-distortion optimizing apparatus 230 may select a quantization parameter and a compression mode that optimizes a rate-distortion, may quantize and encode the depth image based on the optimal compression mode and the optimal quantization parameter, and may output the quantized and encoded depth image.

The rate-distortion optimizing apparatus 230 may include a candidate quantization parameter generator 231, a transformation unit 232, a quantizer 233, an encoder 234, a dequantizer 235, an inverse-transformation unit 236, a compression mode selector 237, and a quantization parameter selector 238, for example.

The candidate quantization parameter generator 231 may receive information indicating whether an edge has been detected within or in a corresponding area of the color image, and may generate at least one quantization parameter based on whether the edge is detected. In this example, when the edge is determined to exist, compression may be performed using relatively low quantization parameters as candidate quantization parameters, and when the edge does not exist, an optimal quantization parameter may be selected using relatively high quantization parameters as the candidate quantization parameters. When an edge exists in a corresponding area of the color image, an edge may also exist in the corresponding area of the depth image, which may have an affect when image synthesis is performed at a point of view. Accordingly, it is more effective to use a low quantization parameter that will not deteriorate the image quality as much as a higher quantization parameter. When an edge is not detected, i.e., the corresponding area of the depth image may also be inferred to not include an edge, which may not affect image synthesis, and thus, it may be more effective to use a high quantization parameter in the encoding of the corresponding portion of the depth image.

In an embodiment, when at least two quantization parameter are generated, the candidate quantization parameter generator 231 may use one of the at least two quantization parameter as a reference quantization parameter, for example.

The transformation unit 232 may receive a differential signal from the subtractor 220, which calculates a difference between the input depth image and the predicted image from predictor 210. The transformation unit 232 may transform the differential signal into a frequency domain.

The quantizer 233 may quantize the transformed differential signal based on a respective step size corresponding to a candidate quantization parameter, for each candidate quantization parameter generated by the candidate quantization parameter generator 231.

The encoder 234 may encode each of the signals that are quantized by the quantizer 233 for each candidate quantization parameter.

The dequantizer 235 may dequantize each of the signals that are quantized by the quantizer for each candidate quantization parameter.

The inverse-transformation unit 236 may inverse-transform each of the dequantized signals, dequantized by the dequantizer 235, for each candidate quantization parameter.

The compression mode selector 237 may calculate a rate-distortion cost for each candidate quantization parameter, and may calculate a compression mode that minimizes the rate-distortion cost for each candidate quantization parameter.

The quantization parameter selector 238 may select one of the candidate quantization parameters, based on the rate-distortion cost calculated for each candidate quantization parameter.

The encoder 234 may compress the quantized signal, quantized based on the selected quantization parameter, using the compression mode selected by the compression mode selector 237, and may output the compressed signal, i.e., the compressed depth image.

The compression mode selector 237 may change a standard, e.g., factors or priorities of the same, considered in the selecting of the compression mode based on a determined existence/non-existence of a color image at a different point of view, which is to be compared through warping. The quantization parameter selector 238 may change a standard, e.g., factors or priorities of the same, considered in the selecting between quantization parameters, based on the existence/non-existence of the color image at a different point of view, which is to be compared through warping. In this example, the existence of a color image at a different point of view, which is to be compared through warping, may be informative of whether remaining points of view exists, in addition to the transmitted points of view, in a 3D video compression encoding system. For example, when images are photographed at five points of view and only three points of view have been encoded and transmitted, two points of view may be color images at different points of view, which are to be compared through warping. The warping may denote generating of the color image at a different point of view using a color image and a depth image, with both images having the same point of view.

The compression mode selector 237 may select the compression mode and the quantization parameter selector 238 may select the quantization parameter, based on whether the color image at a different point of view, which is to be compared through the warping, exists. Such further rate-distortion optimization based upon whether the color image is of a different point of view, i.e., viewpoint, will be further described below with reference to FIGS. 3 and 4. In one or more embodiments, the rate-distortion optimizing process may be implemented by a rate-distortion optimizing apparatus, such in the stereoscopic image compressing apparatus 100 of FIG. 1, the depth image encoder 160 of FIG. 1, the depth image encoding apparatus 200 of FIG. 2, and/or the rate-distortion optimizing apparatus of FIG. 230 of FIG. 2, but is not limited to the same.

Figure 3:
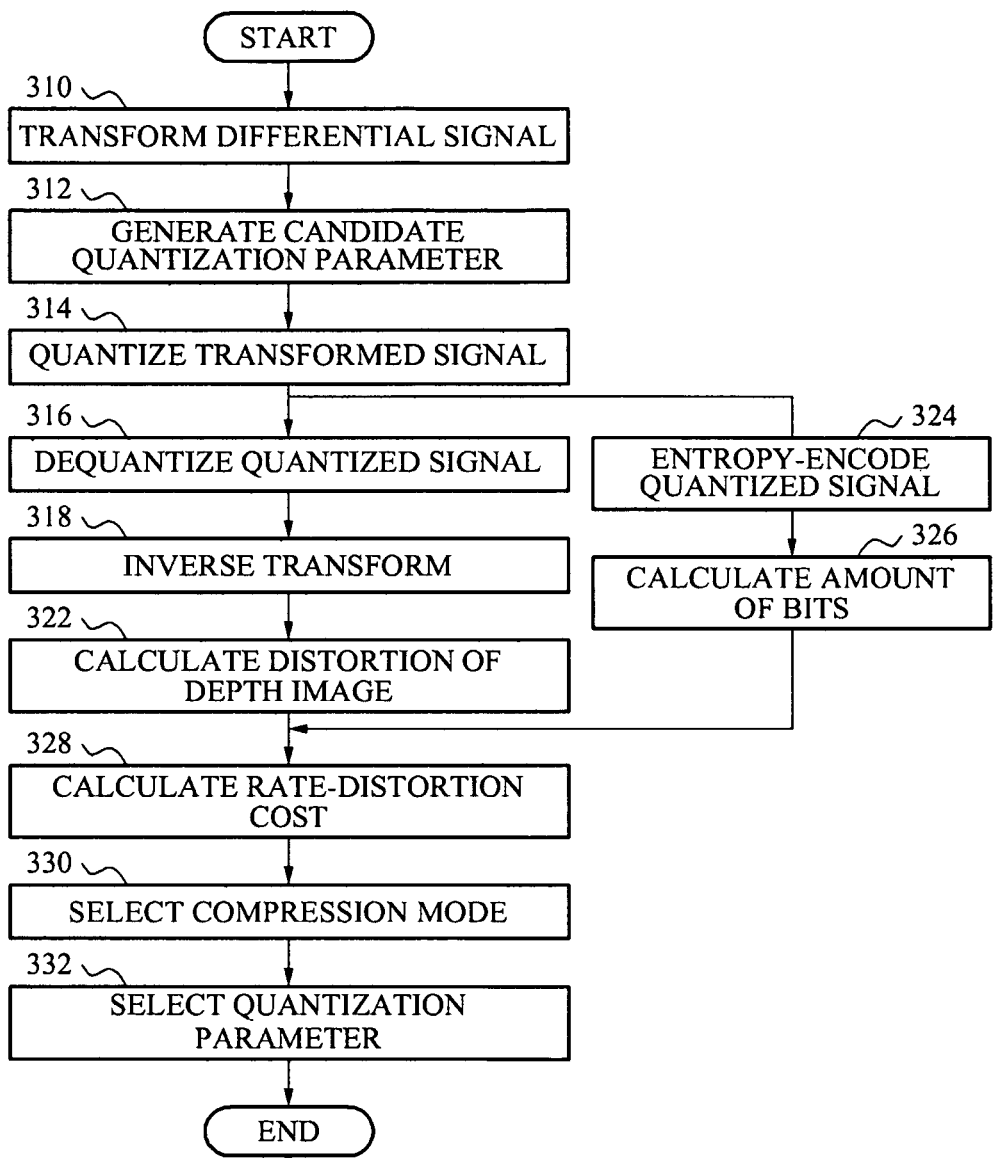
FIG. 3 illustrates a rate-distortion optimizing process of when a color image from a different point of view, which is to be compared through warping, does not exist, according to one or more embodiments.

FIG. 3 illustrates a rate-distortion optimizing process that may be used when plural color images are from the same viewpoint, e.g., when a color image from a different point of view, which is to be compared through warping, is determined to not exist, according to one or more embodiments.

Referring to FIG. 3, a differential signal obtained by calculating a difference between an input depth image and a predicted depth image may be received, and the differential signal may be transformed into a frequency domain, in operation 310.

Information associated with an edge in a color image corresponding to the input depth image may be received, and at least one candidate quantization parameter may be generated based on whether the edge exists, in operation 312. In an embodiment, the at least one generated candidate quantization parameter may be a single reference quantization parameter and at least one subsidiary quantization parameter. In one or more embodiments, when the edge is determined to exist, compression may be performed using relatively low quantization parameters as candidate quantization parameters, and when the edge is determined to not exist, an optimal quantization parameter may be selected using relatively high quantization parameters as the candidate quantization parameters. When an edge exists in an area of the color image, an edge may also exist in a corresponding area of the depth image, which may an undesired affect when image synthesis is performed at a point of view. Accordingly, it is more effective to use low quantization parameters that would lessen any potential deterioration of image quality. It may be more effective to use a high quantization parameter when the edge is determined to not exist, as the area of the depth image, corresponding to the area of the color image not having an edge, may be inferred to also not include the edge and may not be inferred to affect image synthesis.

The transformed differential signal may be quantized based on a step size of a candidate quantization parameter, for example, for each respective candidate quantization parameter, in operation 314.

Each of the quantized signals are dequantized for each candidate quantization parameter, in operation 316, and each of the dequantized signals are inverse-transformed into the image domain, e.g., from the frequency domain, for each candidate quantization parameter, in operation 318.

A difference between the input depth image and each of the differential signals, obtained by the inverse-transforming, may be calculated for each candidate quantization parameter, and a deterioration of an image may be calculated, in operation 322. A degree of distortion of the depth image may further be calculated, in operation 322.

Each of the quantized signals for each candidate quantization parameter is entropy-encoded, in operation 324, and a number of bits generated when the encoding is performed may be calculated for each candidate quantization parameter, in operation 326, e.g., for fixed or variable bit rate control, according to one or more embodiments. Here, the reference to the calculation of the number of generated bits is not limited to an exact counting of the number of bits.

A rate-distortion cost for each candidate quantization parameter may be calculated, based on the number of generated bits calculated for each candidate quantization parameter and based on the degree of distortion of the depth image calculated for each of the candidate quantization parameters. In an embodiment, the rate-distortion cost may be calculated based on the below Equation 1, for example.

$$J = SSD(s,r) + \lambda * R(s,r,\text{mode},QP)$$ Equation 1:

In Equation 1, J may denote a rate-distortion cost function of a corresponding mode. An SSD, which is an abbreviation of a sum of square difference, may denote a value obtained by the square of a predicted error between an original image (s) and a reference image (r), and λ may denote a Lagrangian coefficient, which dependents on a quantization parameter. R may denote a number of bits used when a signal obtained by calculating a difference between the original image and a predicted image is encoded based on the corresponding compression mode and the corresponding quantization parameter, the predicted image being predicted from previously encoded depth images.

A compression mode may be selected that minimizes a rate-distortion cost for each candidate quantization parameter, in operation 330.

An optimal quantization parameter may be selected from among the candidate quantization parameters, in operation 332.

In operation 322, to select the optimal quantization parameter, the quantized signals for each candidate quantization parameter may be compressed based on the selected compression mode, the compressed signals may be restored, and the restored depth image may be compared with the input depth image to calculate a disparity value. A differential value may be calculated between the disparity value of the reference quantization parameter and a disparity value of each of the least one subsidiary quantization parameter included in the at least one candidate quantization parameter, and, as the optimal quantization parameter, a quantization parameter having a greatest value may be selected from among the reference quantization parameter and a subsidiary quantization parameter having a smaller difference value than a predetermined reference value.

In one or more embodiments, the reference quantization parameter may be selected as the optimal quantization parameter when a determination indicates that no subsidiary quantization parameter having the difference value smaller than the predetermined reference value exists.

Figure 4:
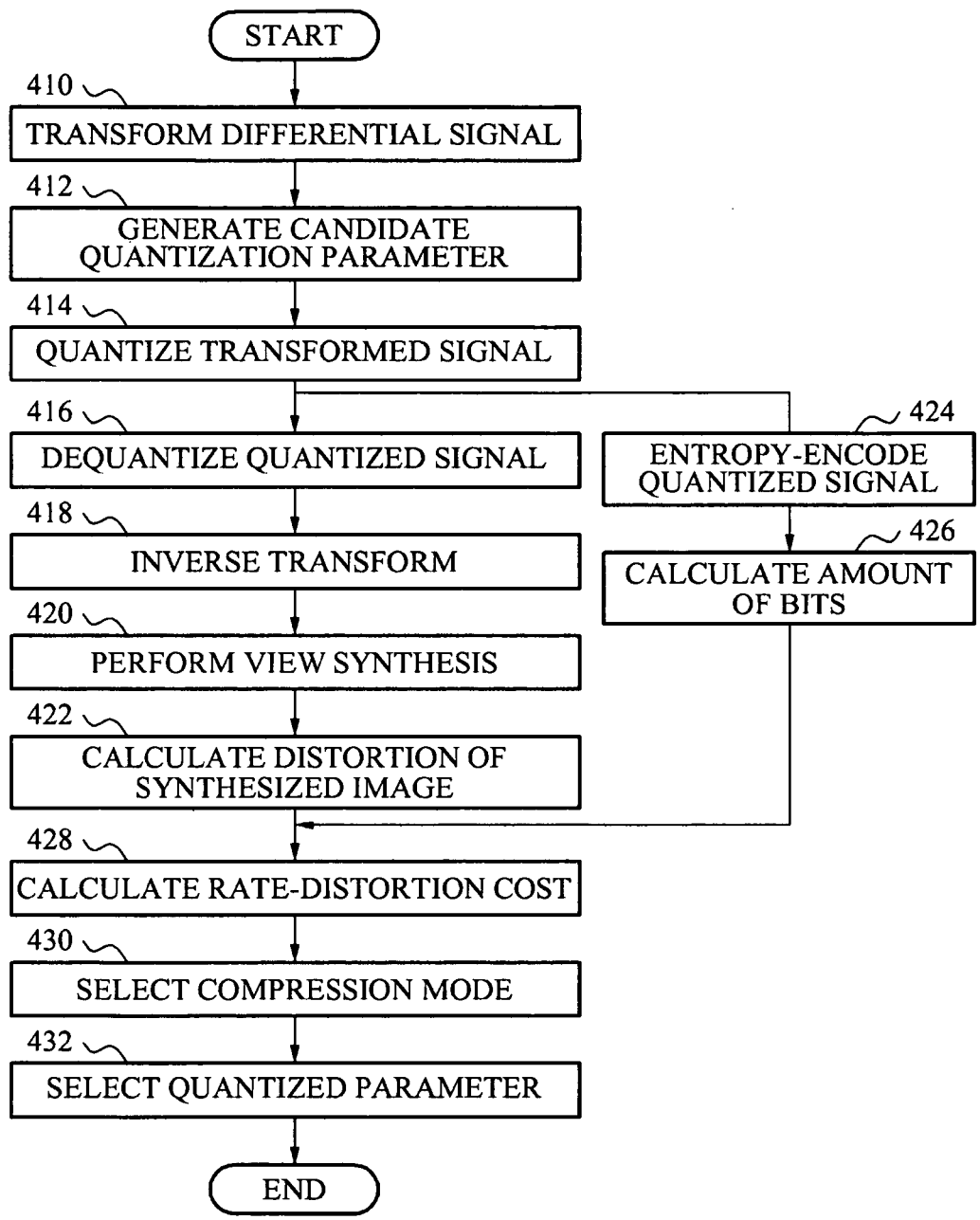
FIG. 4 illustrates a rate-distortion optimizing process of when a color image from a different point of view, which is to be compared through warping, exists, according to one or more embodiments.

FIG. 4 illustrates a rate-distortion optimizing process that may be used upon the existence of plural color images respectively from different viewpoints being confirmed, e.g., when a color image from a different point of view, which is to be compared through warping, exists, according to one or more embodiments.

Referring to FIG. 4, a differential signal, obtained by calculating a difference between an input depth image and a predicted depth image, may be received and the received differential signal may be transformed into a frequency domain, in operation 410.

Based on a determination of whether an edge exists in an area of a color image corresponding to an area of the input depth image, at least one candidate quantization parameter may be generated. In one or more embodiments, when the edge is determined to exist, compression may be performed using relatively low quantization parameters as candidate quantization parameters, and when the edge is determine to not exist, an optimal quantization parameter may be selected using relatively high quantization parameters as the candidate quantization parameters. When an edge exists in an area of the color image, an edge may also exist in a corresponding area of the depth image, which may have an undesirable affect when image synthesis is performed at a point of view. Accordingly, in one or more embodiments, it may be more effective to use a low quantization parameter that is less likely to deteriorate image quality of the depth image. When the edge is determined to not exist, the area of the depth image that does not include the edge may not undesirably affect image synthesis and thus, it is more effective to then use a high quantization parameter.

The transformed differential signal may be quantized based on a step size of a candidate quantization parameter, for each candidate quantization parameter, in operation 414.

Each of the quantized signals are dequantized for each candidate quantization parameter, in operation 416, and each of dequantized signals are inverse-transformed for each candidate quantization parameter, in operation 418.

A view-synthesis may be performed with respect to a restored depth image, restored for each quantization parameter, and a corresponding color image, and a warped color image may be generated at a different point of view, in operation 420. The view synthesizing may be performed by the view synthesis unit 190 of FIG. 1

A difference between the warped color image and a color image at a different point of view may be calculated, and a deterioration of an image may be calculated, in operation 422. The degree of distortion of the warped color image may be calculated for each candidate quantization parameter, in operation 422.

Each of the quantized signals for each candidate quantization parameter may be encoded, in operation 424, and the number of bits generated may be calculated when the encoding is performed for each candidate quantization parameter, in operation 426.

A rate-distortion cost for each candidate quantization parameter may be calculated, based on the calculated number of generated bits, calculated for each candidate quantization parameter, and the degree of distortion of the warped color image calculated for each candidate quantization parameter. The rate-distortion cost may be calculated based on the below Equation 2, for example.

$$J = SSD(s,r) + \lambda * R(s,r,\text{mode},QP) \quad \text{Equation 2:}$$

In Equation 2, J may be a rate-distortion cost function of a corresponding mode, a SSD may denote a value obtained by the square of a difference value between the warped color image and the color image at a different point of view, and λ may denote a Lagrangian coefficient, which dependents on a quantization parameter. R may denote a number of bits used when a signal obtained by calculating a difference between the original depth image and a predicted image is encoded based on the corresponding compression mode and the corresponding quantization parameter, the predicted image being predicted from previously encoded depth images.

A compression mode that minimizes a rate-distortion cost for each candidate quantization parameter may be selected, in operation 430.

An optimal quantization parameter may be selected from among the at least one candidate quantization parameter, in operation 432.

The rate-distortion cost may be calculated based on the selected compression mode for each candidate quantization parameter, and a quantization parameter having a smallest rate-distortion cost may be selected from among candidate quantization parameters having smallest rate-distortion costs.

One or more embodiments may include a rate-distortion optimizing apparatus and method for encoding a depth image, when the depth image is compressed in a 3D video compression encoding system. The rate-distortion optimizing apparatus and method may reduce a resolution of the depth image, or in an area of the depth image, that is determined to not include an edge, which would significantly affects image synthesis, and may use a higher quantization parameter than that used when the depth image is inferred to include edge, and thus, may provide a high compression performance.

In one or more embodiments, any apparatus, system, and unit descriptions herein include one or more hardware devices and/or hardware processing elements/devices. In one or more embodiments, any described apparatus, system, and unit may further include one or more desirable memories, and any desired hardware input/output transmission devices, as only examples. Further, the term apparatus should be considered synonymous with elements of a physical system, not limited to a device, i.e., a single device at a single location, or enclosure, or limited to all described elements being embodied in single respective element/device or enclosures in all embodiments, but rather, depending on embodiment, is open to being embodied together or separately in differing devices or enclosures and/or differing locations through differing hardware elements.

In addition to the above described embodiments, embodiments can also be implemented through computer readable code/instructions in/on a non-transitory medium, e.g., a computer readable medium, to control at least one processing element/device, such as a processor, computing device, computer, or computer system with peripherals, to implement any above described embodiment. The medium can correspond to any defined, measurable, and tangible structure permitting the storing and/or transmission of the computer readable code. Additionally, one or more embodiments include the at least one processing element or device.

The media may also include, e.g., in combination with the computer readable code, data files, data structures, and the like. One or more embodiments of computer-readable media include magnetic media such as hard disks, floppy disks, and magnetic tape; optical media such as CD ROM disks and DVDs; magneto-optical media such as optical disks; and hardware devices that are specially configured to store and/or perform program instructions, such as read-only memory (ROM), random access memory (RAM), flash memory, and the at least one processing device, respectively. Computer readable code may include both machine code, such as produced by a compiler, and files containing higher level code that may be executed by the computer using an interpreter, for example. The media may also be any defined, measurable, and tangible elements of one or more distributed networks, so that the computer readable code is stored and/or executed in a distributed fashion. In one or more embodiments, such distributed networks do not require the computer readable code to be stored at a same location, e.g., the computer readable code or portions of the same may be stored remotely, either stored remotely at a single location, potentially on a single medium, or stored in a distributed manner, such as in a cloud based manner. Still further, as noted and only as an example, the processing element could include a processor or a computer processor, and processing elements may be distributed and/or included in a single device. There may be more than one processing element and/or processing elements with plural distinct processing elements, e.g., a processor with plural cores, in which case one or more embodiments would include hardware and/or coding to enable single or plural core synchronous or asynchronous operation.

The computer-readable media may also be embodied in at least one application specific integrated circuit (ASIC) or Field Programmable Gate Array (FPGA), as only examples, which execute (processes like a processor) program instructions.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. A method of optimizing compression of a 3D image including at least a color image and a depth image, the method comprising:
  generating at least one candidate quantization parameter based on whether an edge is detected in an area of the color image corresponding to an area of the depth image;
  calculating a rate-distortion cost with respect to each of the at least one candidate quantization parameter based on a determined degree of distortion of each of the at least one candidate quantization parameter and based on a determined number of generated bits for each of the at least one candidate quantization parameter;
  selecting a compression mode that minimizes the calculated rate-distortion cost with respect to each of the at least one candidate quantization parameter; and
  selecting an optimal quantization parameter from among the at least one candidate quantization parameter for an encoding of the depth image.

2. The method of claim 1, wherein the generating of the at least one candidate quantization parameter comprises:
  generating the at least one candidate quantization parameter, according to the edge being detected, so as to represent a smaller step size than a step size represented by at least one candidate quantization parameter generated according to the edge not being detected.

3. The method of claim 1, wherein the number of generated bits is a number of bits generated when a differential signal of the depth image is entropy-encoded, after being transformed and quantized with respect to each of the at least one candidate quantization parameter.

4. The method of claim 1, wherein the degree of distortion is a difference between the depth image and a restored depth image, restored by dequantizing and inverse-transforming with respect to each of the at least one candidate quantization parameter.

5. The method of claim 1, wherein the degree of distortion is calculated by performing:
  view-synthesizing a restored depth image, restored by dequantizing and inverse-transmitting with respect to the at least one candidate quantization parameter, and a corresponding color image, and generating a warped color image at a different point of view; and
  calculating the degree of distortion with respect to the at least one candidate quantization parameter by comparing a difference between the warped color image, warped with respect to the at least one candidate quantization parameter, and a color image at a different point of view.

6. The method of claim 1, wherein the generating of the at least one candidate quantization parameter comprises:
  generating a single reference quantization parameter and at least one subsidiary quantization parameter.

7. The method of claim 6, wherein the selecting of the optimal quantization parameter comprises:
  calculating a disparity value by comparing the depth image with a restored depth image, restored after being compressed based on the selected compression mode, selected with respect to each of the at least one candidate quantization parameter;
  calculating a difference value between a disparity value of the reference quantization parameter and a disparity value of each of the at least one subsidiary quantization parameter included in the at least one candidate quantization parameter; and
  selecting, as the optimal quantization parameter, a quantization parameter having a greatest value from among the reference quantization parameter and a subsidiary quantization parameter having a difference value smaller than a predetermined reference value.

8. The method of claim 1, wherein the selecting of the optimal quantization parameter comprises:
  calculating a rate-distortion cost by applying the selected compression mode, selected with respect to each of the at least one candidate quantization parameter; and
  selecting, from among the at least one candidate quantization parameter, a quantization parameter having a smallest rate-distortion cost to which the selected compression mode is applied, as the optimal quantization parameter.

9. An apparatus for optimizing compression of a 3D image including at least a color image and a depth image, the apparatus comprising:
  a candidate parameter generator to generate at least one candidate quantization parameter based on whether an edge is detected in an area of the color image corresponding to an area of the depth image;
  a compression mode selector to calculate a rate-distortion cost with respect to each of the at least one candidate quantization parameter based on a determined degree of distortion of each of the at least one candidate quantization parameter and based on a determined number of generated bits of each of the at least one candidate quantization parameter, and to select a compression mode that minimizes the calculated rate-distortion cost with respect to each of the at least one candidate quantization parameter; and
  a quantization parameter selector to select an optimal quantization parameter from among the at least one candidate quantization parameter for an encoding of the depth image.

10. The apparatus of claim 9, wherein the candidate quantization parameter generator generates the at least one candidate quantization parameter, when the edge is detected, so as to represent a smaller step size than a step size represented by at least one candidate quantization parameter generated according to when the edge is not detected.

11. The apparatus of claim 9, wherein the number of generated bits is a number of bits generated when a differential signal of the depth image is entropy-encoded, after being transformed and quantized with respect to each of the at least one candidate quantization parameter.

12. The apparatus of claim 9, wherein the degree of distortion is a difference between the depth image and a restored depth image, restored by dequantizating and inverse-transforming with respect to each of the at least one candidate quantization parameter.

13. The apparatus of claim 9, wherein the degree of distortion is calculated by performing:
   view-synthesizing a restored depth image, restored by dequantizing and inverse-transmitting with respect to the at least one candidate quantization parameter and a corresponding color image, and generating a warped color image at a different point of view, and
   calculating the degree of distortion with respect to the at least one candidate quantization parameter by comparing a difference between the warped color image, warped with respect to the at least one candidate quantization parameter, and a color image at a different point of view.

14. The apparatus of claim 9, wherein the candidate quantization parameter generator generates a single reference quantization parameter and at least one subsidiary quantization parameter.

15. The apparatus of claim 14, wherein the quantization parameter selector performs:
   calculating a disparity value by comparing the depth image with a restored depth image, restored after being compressed based on the selected compression mode with respect to each of the at least one candidate quantization parameter;
   calculating a difference value between a disparity value of the reference quantization parameter and a disparity value of each of the at least one subsidiary quantization parameter included in the at least one candidate quantization parameter; and
   selecting, as the optimal quantization parameter, a quantization parameter having a greatest value from among the reference quantization parameter and a subsidiary quantization parameter having a difference value smaller than a predetermined reference value.

16. The apparatus of claim 9, wherein the quantization parameter selector calculates a rate-distortion cost by applying the selected compression mode, selected with respect to each of the at least one candidate quantization parameter, and selects, from among the at least one candidate quantization parameter, a quantization parameter having a smallest rate-distortion cost to which the selected compression mode is applied, as the optimal quantization parameter.

17. A method of optimizing compression of a 3D image including at least a color image and a depth image, the method comprising:
   determining whether a spatial characteristic is detected in an area of the color image corresponding to an area of the depth image, wherein the spatial characteristic would exist in the area of the depth image when the spatial characteristic exists in the area of the color image;
   encoding the color image and the depth image, wherein the encoding of the depth image includes selectively encoding the depth image using a first quantization step size for at least the area of the depth image upon the determining indicating that the spatial characteristic is not detected in the area of the color image and encoding the depth image using a second quantization step size for at least the area of the depth image upon the determining indicating that the spatial characteristic is detected, wherein the first quantization step size is larger than the second quantization step size; and
   outputting the encoded color image an the encoded depth image.

18. The method of claim 17, wherein the encoding of the depth image further comprises setting the first and second quantization step sizes to be different from a preset quantization step size, preset for encodings of depth images, according to a calculated rate-distortion cost with respect to plural candidate quantization parameters based on a determined degree of distortion of each of the plural candidate quantization parameters.

19. The method of claim 18, wherein the calculated rate-distortion cost is further based on a determined number of generated bits for each of the plural candidate quantization parameters.

20. An apparatus for optimizing compression of a 3D image including at least a color image and a depth image, the apparatus comprising:
   an detector to determine whether a spatial characteristic is detected in an area of the color image corresponding to an area of the depth image, wherein the spatial characteristic would exist in the area of the depth image when the spatial characteristic exists in the area of the color image;
   a color image encoder to encode the color image;
   a depth image encoder to encode the depth image, wherein the encoding of the depth image includes selectively encoding the depth image using a first quantization step size for at least the area of the depth image upon the detector indicating that the spatial characteristic is not detected in the area of the color image and encoding the depth image using a second quantization step size for at least the area of the depth image upon the determining indicating that the spatial characteristic is detected, wherein the first quantization step size is larger than the second quantization step size; and
   a view synthesis unit to output a stereoscopic image based on the encoded color image an the encoded depth image.

21. The apparatus of claim 20, wherein the depth image encoder sets the first and second quantization step sizes to be different from a preset quantization step size, preset for encodings of depth images, according to a calculated rate-distortion cost with respect to plural candidate quantization parameters based on a determined degree of distortion of each of the plural candidate quantization parameters.

22. The apparatus of claim 21, wherein the calculated rate-distortion cost is further based on a determined number of generated bits for each of the plural candidate quantization parameters.

23. At least one non-transitory medium comprising computer readable code to control at least one processing device to implement a method of optimizing compression of a 3D image including at least a color image and a depth image, the method comprising:
   generating at least one candidate quantization parameter based on whether an edge is detected in an area of the color image corresponding to an area of the depth image;
   calculating a rate-distortion cost with respect to each of the at least one candidate quantization parameter based on a determined degree of distortion of each of the at least one candidate quantization parameter and based on a determined number of generated bits for each of the at least one candidate quantization parameter;
   selecting a compression mode that minimizes the calculated rate-distortion cost with respect to each of the at least one candidate quantization parameter; and
   selecting an optimal quantization parameter from among the at least one candidate quantization parameter for an encoding of the depth image.

24. At least one non-transitory medium comprising computer readable code to control at least one processing device to implement a method of optimizing compression of a 3D image including at least a color image and a depth image, the method comprising:

determining whether a spatial characteristic is detected in an area of the color image corresponding to an area of the depth image, wherein the spatial characteristic would exist in the area of the depth image when the spatial characteristic exists in the area of the color image;

encoding the color image and the depth image, wherein the encoding of the depth image includes selectively encoding the depth image using a first quantization step size for at least the area of the depth image upon the determining indicating that the spatial characteristic is not detected in the area of the color image and encoding the depth image using a second quantization step size for at least the area of the depth image upon the determining indicating that the spatial characteristic is detected, wherein the first quantization step size is larger than the second quantization step size; and outputting the encoded color image an the encoded depth image.

* * * * *

UNITED STATES PATENT AND TRADEMARK OFFICE
CERTIFICATE OF CORRECTION

PATENT NO. : 8,768,086 B2  Page 1 of 1
APPLICATION NO. : 13/067756
DATED : July 1, 2014
INVENTOR(S) : Jin Young Lee et al.

It is certified that error appears in the above-identified patent and that said Letters Patent is hereby corrected as shown below:

In the Claims

Column 15, Line 62, In Claim 17, delete "an the" and insert -- and the --, therefor.

Column 16, Line 31, In Claim 20, delete "an the" and insert -- and the --, therefor.

Column 17, Line 17, In Claim 24, delete "an the" and insert -- and the --, therefor.

Signed and Sealed this
Twenty-eighth Day of October, 2014

Michelle K. Lee
*Deputy Director of the United States Patent and Trademark Office*